(12) United States Patent
VanZandt et al.

(10) Patent No.: US 6,618,325 B1
(45) Date of Patent: Sep. 9, 2003

(54) METHOD AND APPARATUS FOR CONTROLLING DAMPING AND IN SITU DETERMINATION OF FREQUENCY RESPONSE FOR HIGH BANDWIDTH FORCE-BALANCE SINGLE-COIL GEOPHONE

(76) Inventors: Thomas R. VanZandt, 206 Avenue C, Redondo Beach, CA (US) 90277; Stephen J. Manion, 2231 Midlothian Dr., Altadena, CA (US) 91001

(*) Notice: Subject to any disclaimer, the term of this patent is extended or adjusted under 35 U.S.C. 154(b) by 0 days.

(21) Appl. No.: 09/831,701

(22) PCT Filed: Nov. 10, 1999

(86) PCT No.: PCT/US99/26495

§ 371 (c)(1),
(2), (4) Date: May 10, 2001

(87) PCT Pub. No.: WO00/28782

PCT Pub. Date: May 18, 2000

Related U.S. Application Data (60) Provisional application No. 60/107,990, filed on Nov. 10, 1998.

(51) Int. Cl.$^7$ .......................... H04R 11/00; G01P 15/13
(52) U.S. Cl. ........................................ 367/182
(58) Field of Search ................ 367/182, 185; 181/121; 73/514.01, 514.17

(56) References Cited

U.S. PATENT DOCUMENTS

| | | | |
|---|---|---|---|
| 2,162,455 A | 6/1939 | Hoge | 215/56 |
| 2,562,983 A | 8/1951 | Clewell | 177/352 |
| 2,739,724 A | 3/1956 | Gora | 215/40 |
| 3,508,444 A | 4/1970 | Sitomer et al. | 73/517 |
| 3,589,545 A | 6/1971 | Carpenter, Jr. | 215/56 |
| 3,633,053 A | 1/1972 | Peters | 310/15 |
| 3,877,314 A | 4/1975 | Bernin | 73/517 |
| 4,051,718 A | 10/1977 | Meckl et al. | 73/71.2 |
| 4,121,728 A | 10/1978 | Tagalakis et al. | 215/260 |
| 4,144,764 A | 3/1979 | Hartzell, Jr. | 73/497 |
| 4,190,170 A | 2/1980 | Boyd | 215/307 |
| 4,253,164 A | 2/1981 | Hall, Jr. | 367/22 |
| 4,344,235 A | 8/1982 | Flanders | 33/366 |
| 4,412,317 A | 10/1983 | Asjes et al. | 367/185 |
| 4,538,203 A | 8/1985 | Flanner et al. | 361/159 |
| 4,598,835 A | 7/1986 | Brownbill | 215/307 |
| 4,880,127 A | 11/1989 | Doi | 215/252 |
| 4,891,983 A | 1/1990 | Stewart | 73/517 B |
| 5,033,028 A | 7/1991 | Browning | 367/1 |
| 5,119,345 A | 6/1992 | Woo et al. | 367/185 |
| 5,172,345 A | 12/1992 | van der Poel | 367/178 |
| 5,257,708 A | 11/1993 | Dubach | 220/335 |
| 5,542,585 A | 8/1996 | Peters et al. | 222/531 |
| 5,785,196 A | 7/1998 | Montgomery | 215/354 |
| 5,789,677 A | 8/1998 | McEachern | 73/514.19 |
| 5,803,286 A | 9/1998 | Pfefferkorn et al. | 215/307 |
| 5,853,096 A | 12/1998 | Bartur et al. | 215/261 |
| 6,075,754 A | 6/2000 | VanZandt et al. | 367/182 |

FOREIGN PATENT DOCUMENTS

| | | | |
|---|---|---|---|
| WO | WO 99/49324 | 9/1999 | |

OTHER PUBLICATIONS

Lemkin et al., Athree–Axis Micromachined Accelerometer with a CMOS Position–Sense Interface an Digital Offset–Trim Electronics, Apr. 1999, IEEE Journal of Solid–State Circuits, vol. 34, No. 4, pp. 456–468.*

(List continued on next page.)

*Primary Examiner*—Daniel T. Pihulic
(74) *Attorney, Agent, or Firm*—Christie, Parker & Hale, LLP (57) ABSTRACT

Force-balance feedback geophone apparatus and methods for characterization of the geophone apparatus. Control inputs (65) provide for switching (61, 63) of a force-balance feedback geophone between operational states, thereby allowing for in situ determination of geophone characteristics. Feedback circuit modification provides for increased bandwidth and a series RC circuit in the reference resistance provides for increased damping without significantly affecting low frequency performance.

15 Claims, 9 Drawing Sheets

OTHER PUBLICATIONS

Klaassen et al., "Electronic Acceleration–Sensitive Geophone * For Seismic Prospecting**", Geophysical Prospecting, vol. 31, 1983, pp. 457–480.

Usher et al. "Wide–Band Feedback Seismometers*", Physics of the Earth and Planetary Interiors, vol. 18, (1979), pp. 38–50.

Obuchi et al., "A moving Coil Dynamic accelerometer,", $53^{rd}$ EAED Meeting, May 1991, pp. 1–4.

International Search Report for PCT/US99/26495, published May 18, 2000.

International Preliminary Examination Report for PCT/US99/26495 dated Aug. 30, 2000.

* cited by examiner

METHOD AND APPARATUS FOR CONTROLLING DAMPING AND IN SITU DETERMINATION OF FREQUENCY RESPONSE FOR HIGH BANDWIDTH FORCE-BALANCE SINGLE-COIL GEOPHONE

CROSS REFERENCE TO RELATED APPLICATIONS

This application claims benefit of PCT/US99/26495, filed Nov. 10, 1999, which claims priority of U.S. provisional application No. 60/107,990, filed Nov. 10, 1998.

BACKGROUND OF THE INVENTION

This invention relates generally to geophones, and more particularly to single-coil force-balance geophones.

Geophones are used in seismic imaging to measure velocity or acceleration. Commonly, a geophone includes a housing within which one or more coils are mounted within a magnetic field. The coils generally are mounted to the housing by way of a spring. Thus, movement of the housing results in movement of the coil within the magnetic field, generating an electromotive force (emf) in the coil. The magnitude of the emf is proportional to the velocity of the coil in the magnetic field.

In some applications it is desireable to determine the acceleration of the geophone housing, instead of the velocity. One known method of determining the acceleration of the geophone housing is to utilize a force-balance feedback geophone. In a force-balance feedback geophone, feedback is used to substantially limit the movement of the coil within the magnetic field. In other words, any movement of the coil within the magnetic field is counteracted by a force generated by passing an opposing current through the coil. The magnitude of the current, and accordingly, the magnitude of the voltage associated with the current, provides a measure of the acceleration of the geophone housing.

Utilizing feedback principles, however, imposes design constraints on design of the geophone. Geophone system elements generally should be within a prescribed range to ensure system stability. In addition, the feedback design must account for system damping and bandwidth requirements.

In addition, use of a force-balance feedback geophone presents operational problems. One attribute of an accelerometer, such as a force-balance feedback geophone, is the frequency response of the accelerometer. Detailed knowledge of the frequency response of the geophone allows for more accurate determination of the accelerations imparted to the geophone. Geophone elements such as the coil, however, are sensitive to environmental factors such as the temperature. This sensitivity often results in variations in frequency response.

One method of determining a frequency response of a system is to apply a step input to the system. Thus, the frequency response to a step or other known input can be determined in a force-balance feedback geophone by mechanically accelerating the geophone. This may be accomplished by placing the geophone housing in, for example, a mechanical shaker. In many geophone applications the geophone housing is placed in situations of temperature extremes and in which placement of a mechanical shaker is inconvenient or otherwise not feasible. Thus, the use of mechanical shakers is not always possible.

Conventional geophones not using force-balance feedback may be provided a step input by generating a current in the coil, thereby generating a force which results in movement of the coil within the magnetic field. In a force-balance feedback geophone, however, the feedback circuitry automatically acts to cancel any movement of the coil, and no movement of the coil will occur. Thus, although force-balance feedback geophones allow for direct measurement of accelerations, they also impose difficulties in accurately characterizing the response of the geophone to accelerations.

SUMMARY OF THE INVENTION

The present invention provides a force-balance feedback geophone and a method of characterizing a force-balance feedback geophone. In one embodiment the force-balance feedback geophone comprises a geophone housing having a coil mounted by a spring, the coil being in a magnetic field and having a first terminal and a second terminal. The force-balance feedback geophone further comprises an amplifier with a feedback circuit forming a feedback path, the amplifier having an input coupled to the first terminal. A feedback switch is in the feedback path, and the feedback switch is responsive to a control input. The feedback switch has a first state opening the feedback path and a second state closing the feedback path. The force-balance feedback geophone further comprises a bias switch coupled to the first terminal or second terminal. The bias switch is responsive to the control input and has a first state coupling the first terminal or the second terminal to a bias input and a second state not coupling the first terminal or the second terminal to the bias input.

In one embodiment, a method of the present invention comprises disconnecting a feedback element of a force-balance feedback geophone from a coil of the force-balance feedback geophone. The coil of the force-balance feedback geophone is displaced, and the feedback element of the force-balance geophone is connected to the coil of the force-balance feedback geophone. The output of the force-balance feedback geophone is then measured. In one embodiment, the feedback element is disconnected using an electrically controlled switch. In one embodiment the electrically controlled switch is a transistor.

Many of the attendant features of this invention will be readily appreciated as the same becomes better understood by reference to the following detailed description considered in connection with the accompanying drawings in which like reference numerals indicate like parts throughout.

DETAILED DESCRIPTION OF THE INVENTION

Figure 1:
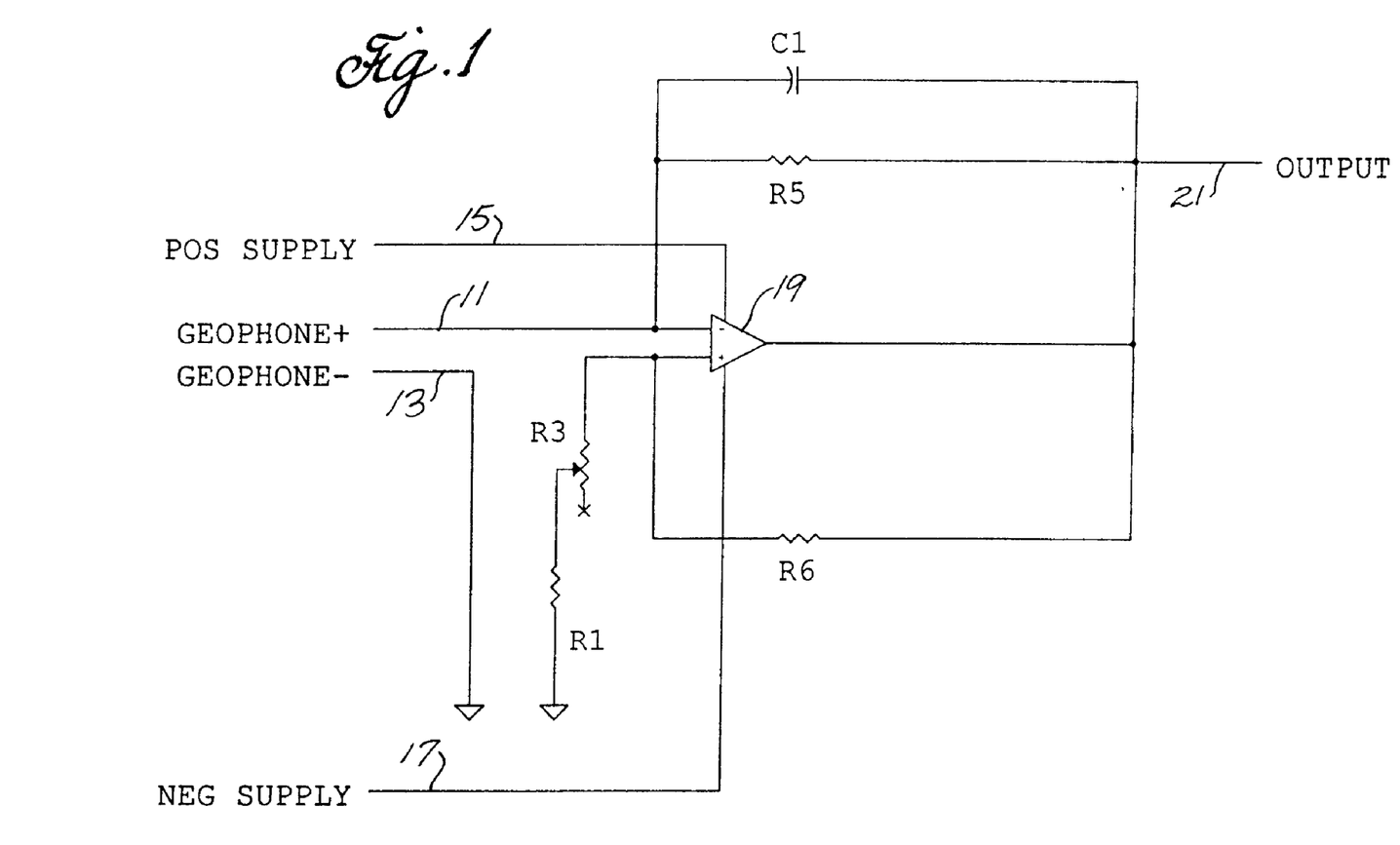
FIG. 1 is a circuit schematic of circuitry for a force-balance feedback geophone.

FIG. 1 illustrates circuitry for a force-balance feedback geophone. As illustrated in FIG. 1, the circuitry is connected to a geophone positive terminal 11, a geophone negative terminal 13, a positive power supply 15, and a negative power supply 17. The geophone positive terminal and geophone negative terminal are connected to opposing terminals of a geophone (not shown). As is understood in the art, a geophone generally comprises an inductive coil mounted via a spring and approximate to a magnet in a geophone housing. The two ends of the inductive coil form the geophone positive and negative terminals. Geophones are additionally discussed, for example, in U.S. patent application Ser. No. 09/058,114 U.S. Provisional Patent Application 60/107,990, and U.S. Provisional Patent Application 60/079,465, the disclosures of the entirety of which are herein incorporated by references.

In the circuitry of FIG. 1 the geophone negative terminal is connected to ground. The geophone positive terminal is connected to an inverting input of an amplifier 19. The amplifier in the circuitry of FIG. 1 is an operational amplifier and provides a large open loop gain (>100 dB). The amplifier output 21 provides an output signal. The noninverting amplifier input is coupled to ground by a series resistance comprised of a reference resistance R1 and by a trimming resistance R3. The amplifier is provided power through connections to the positive power supply and the negative power supply.

The amplifier is provided both positive and negative feedback. Accordingly, the output of the amplifier includes a positive feedback circuit and a negative feedback circuit. The positive feedback circuit includes a resistor R6. The negative feedback circuit comprises a resistor R5 and a capacitor C1 in parallel. The capacitor C1 provides increased stability to the feedback sensor at high frequency. The reference resistance R1, in the embodiment described, is a zero inductance coil winding composed of the same wire as used in the geophone coil. Use of the same wire is used in the geophone coil provides the benefits in terms of temperature matching of the reference impedance on the geophone coil. The series resistance of resistance R1 and trimming resistance R3 are set such that a reference resistance is a resistance approximately 3% to 5% less than that of the geophone coil, and is less than that of the geophone coil to provide increased system stability.

Figure 2:
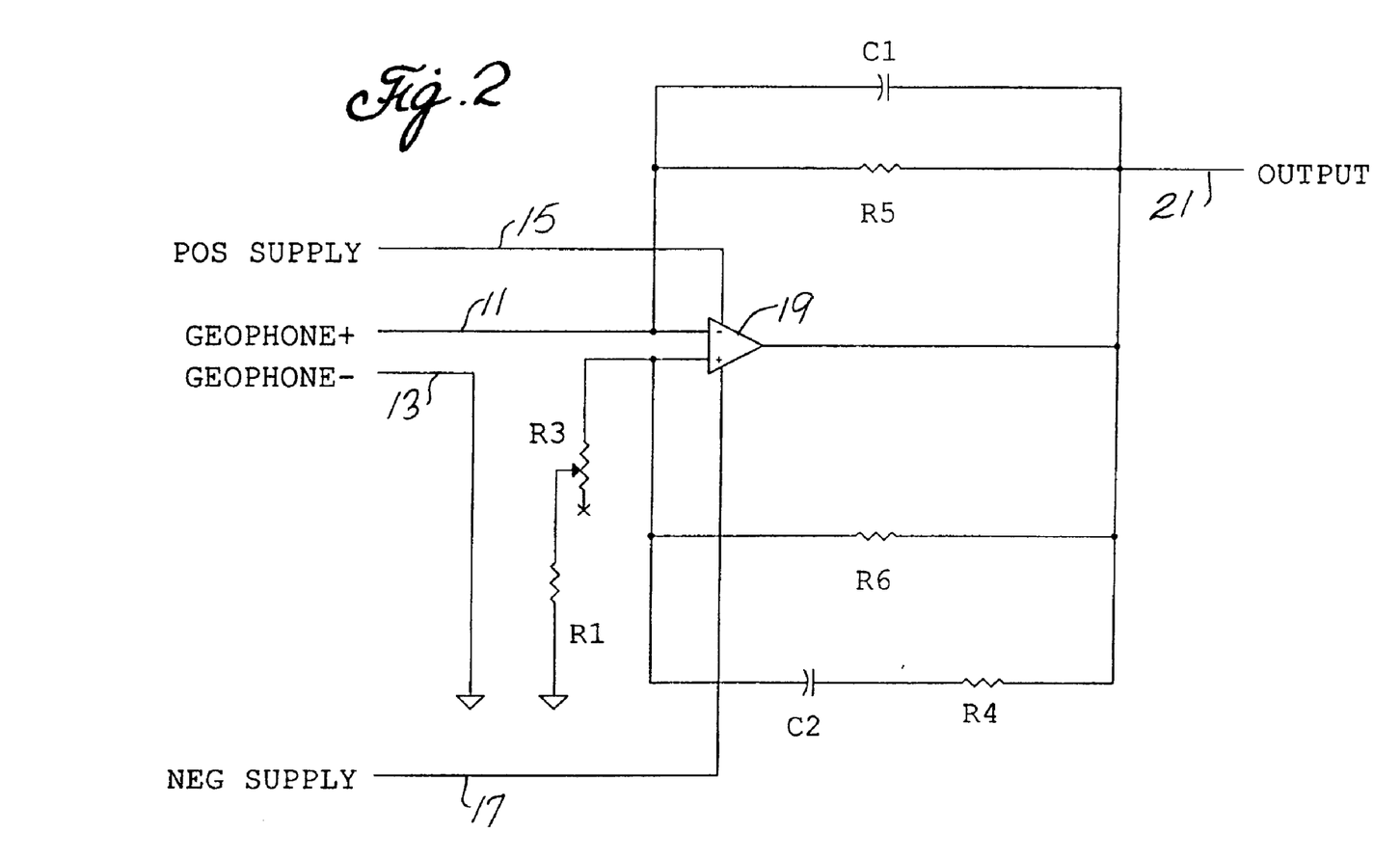
FIG. 2 is a circuit schematic of circuitry for an increased bandwidth force-balance feedback geophone.

FIG. 2 illustrates an embodiment of the present invention for a force-balance feedback geophone. The circuitry of FIG. 2 is similar to the circuitry of FIG. 1, and is similarly connected to positive and negative terminals of a geophone and a positive and negative power supply. The circuitry of FIG. 2, however, additionally includes RC feedback compensation. The RC feedback compensation is provided by including further elements in the positive feedback circuit. While the circuitry of FIG. 1 includes a resistor R6 in the positive feedback path, the circuit of FIG. 2 additionally includes a resistor R4 and a capacitor C2 in parallel to the resistor R6.

At low frequencies the resistor R4 and capacitor C2 presents a relatively large impedance due to the presence of the capacitor C2. Accordingly, current flowing through the positive feedback path is largely comprised of the current flowing through the reference resistance R1. Thus, at low frequencies, the current flowing through the reference resistance R1 largely approximates that of the circuitry of FIG. 1. At increased frequencies, however, the capacitor C2 presents a relatively lower impedance. The lower impedance of the capacitor C2 at higher frequencies allows increased current to flow through the resistance R4. Thus, selection of the values of the resistors R4 and R6, as well as the capacitance of the capacitor C2 such that the increase in the current flowing through resistor R1 occurs approximate the frequencies at which the reactance of the coil within the geophone become significant allows for increased matching of the reference resistor R1 impedance to that of the geophone coil. In other words, the resistor R4 and capacitor C2 allow the transfer function of the positive feedback path to more closely approximate the transfer function of the negative feedback path over an increased frequency range. In one embodiment, the RC compensation is designed to have no effect on the feedback paths at low frequency, e.g., freq<<1/($2\pi R4C2$).

In one embodiment, the circuitry of FIG. 2 is used in conjunction with a Geo Space Corporation GS-14-L3, 3400 ohm, 24 Hz geophone. The use of the additional positive feedback path defined by the resistor R4 and the capacitor C2 provides for matching of the negative feedback path transfer function and the positive feedback path transfer function over a range of frequencies from 0.3 Hz to 330 Hz, or approximately double the bandwidth of the force-balance feedback geophone depicted in FIG. 1.

Figure 3:
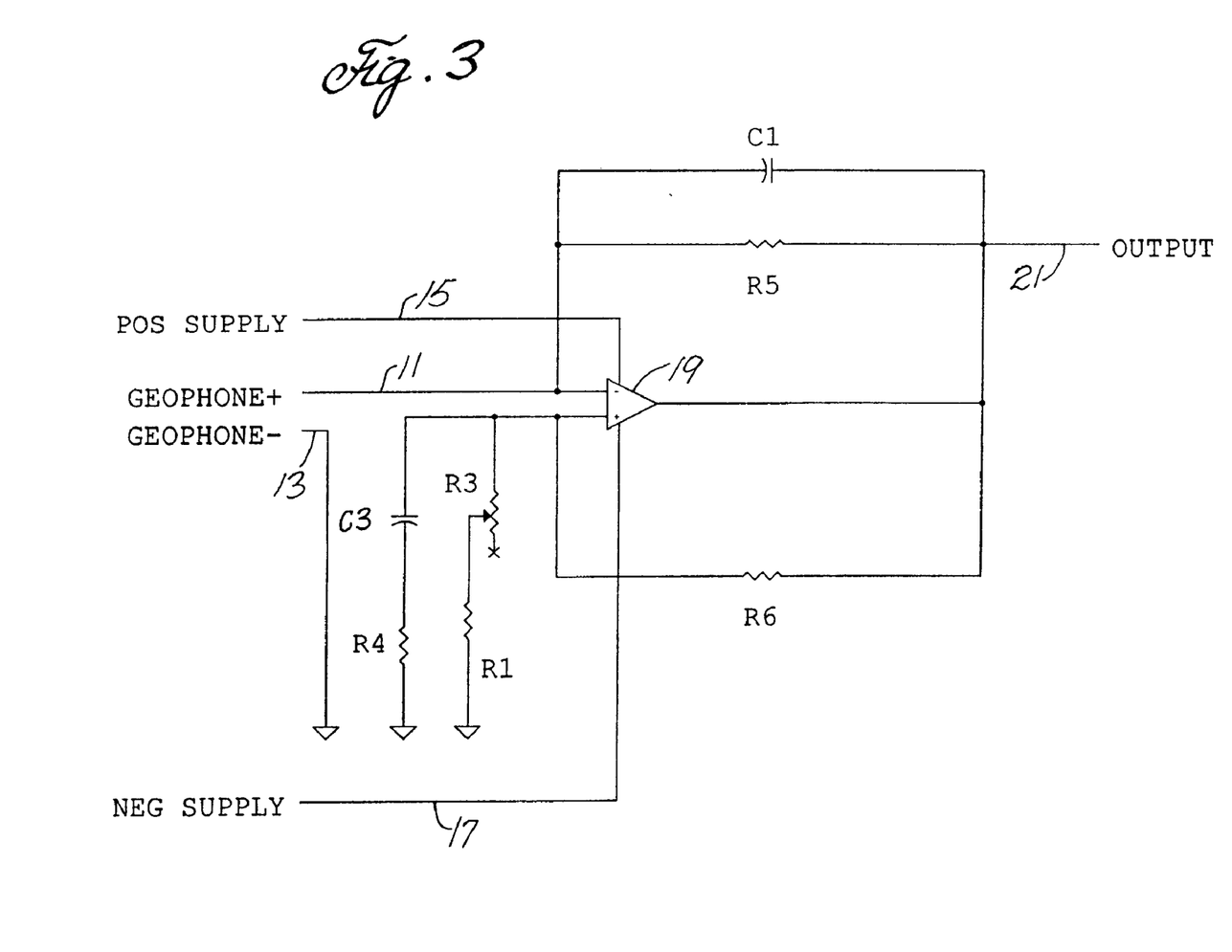
FIG. 3 is a circuit schematic for circuitry for an improved damping damped force-balance feedback geophone.

FIG. 3 illustrates an embodiment of circuitry for a force-balance geophone providing increased system damping without increasing a resistive mismatch between a reference resistance and a resistance of a geophone coil. The circuitry of FIG. 3 is similar to the circuitry of FIG. 1. Accordingly, the circuitry of FIG. 3 is connected to a positive terminal of a geophone, a negative terminal of a geophone, a positive power supply, and a negative power supply. A positive terminal of the geophone is coupled to the inverting input of an amplifier. The noninverting input of the amplifier is coupled to a series reference resistance R1 and a trimming resistance R3. The circuitry of FIG. 3 includes a negative feedback path comprised of a resistor R5 and a capacitor C1 in parallel. The circuitry of FIG. 3 also includes a positive feedback path comprised of a resistor R6. Additionally coupled to the noninverting input of the amplifier is in series a capacitor C3 and a resistor R4. The capacitor C3 and the resistor R4 are also coupled to ground. The capacitor C3 and resistor R4 are connected in parallel with the series resistance of the reference resistance R1 and the trimming resistance R3. At low frequencies the impedance provided by the capacitor C3 is relatively large. Accordingly, at low frequencies, current flow through R4 is less, and therefore at low frequencies the loading effect of the resistor R4 on the reference resistance R1 is minimal. At increased frequencies, however, the impedance provided by the capacitor C3 is reduced and increased current flows through the resistor R4.

Thus, at high frequencies, the resistor R4 increases the loading on R1. In one embodiment, the resistor R4 is selected such that the maximum effect of loading reduces the effect of resistance of the reference resistance R1. In addition, the effect of the resistor R4 at a resonant frequency of the system is determined by the value of the capacitance C3. Accordingly, in the capacitance of the capacitor C3 allows for the varying the degree of loading, and therefore the damping, at the resonant frequency.

Figure 4:
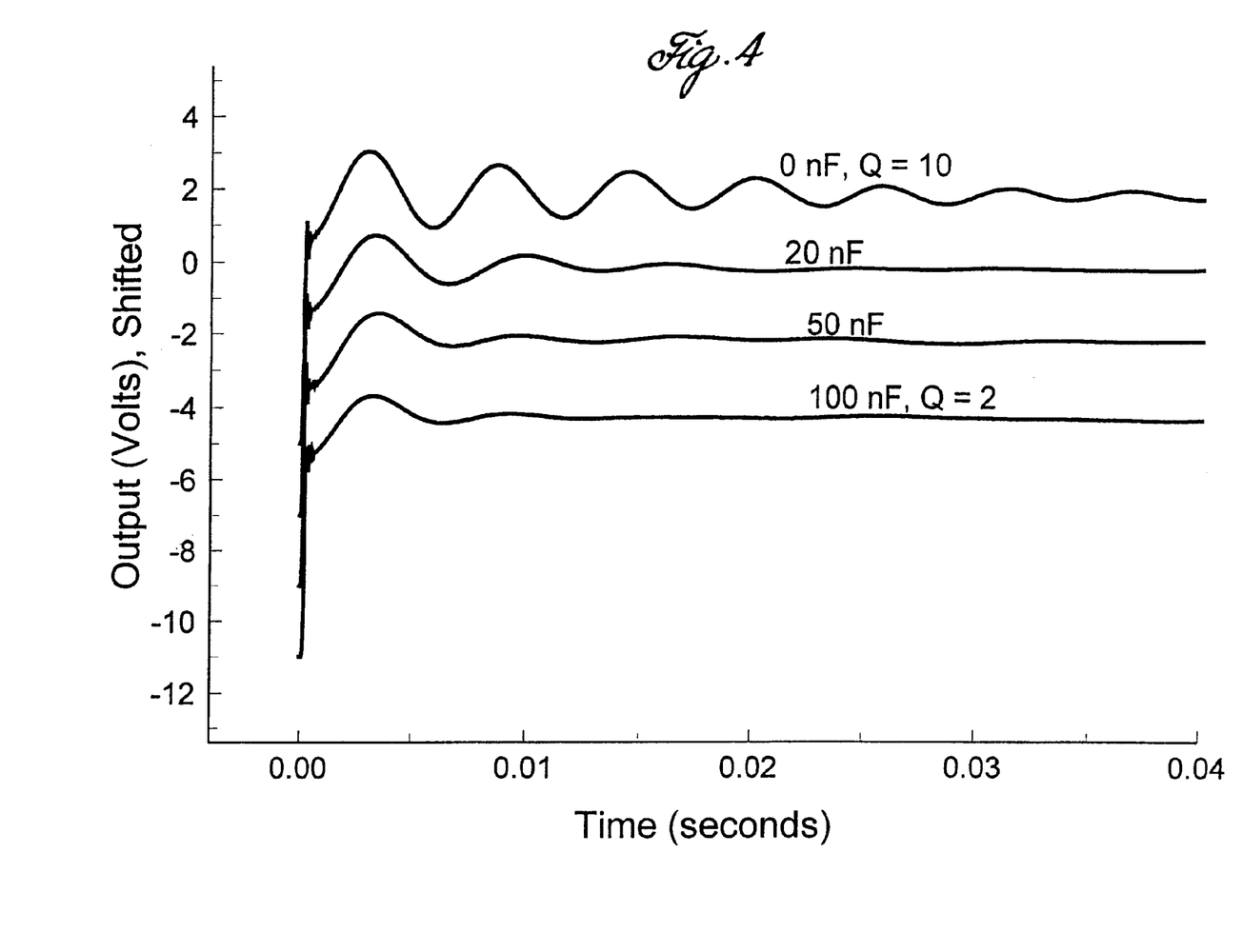
FIG. 4 is a graph of responses to a step input of four configurations of a force-balance feedback geophone with the circuitry of FIG. 3 to a step input.

FIG. 4 is a graph illustrating the response of force-balance geophone utilizing the circuitry of FIG. 3 with differing values for the capacitor C3. In the graph of FIG. 4 a step input is applied to the geophone housing at time t=0. The reference resistance is selected such that a reference resistance is within one percent of the resistance of the geophone coil.

As illustrated in FIG. 4, for a capacitance of zero for capacitor C3 the response of the system is largely underdamped. With increasing capacitance of the capacitor C3, however, the system damping is also increased. Thus, for a 20 nanofarad capacitor, damping is increased as is the case with the 50 nanofarad capacitor as well as 100 nanofarad capacitor. Moreover, as the value of the capacitor C3 is increased from a 0 to 100 nanofarads, the Q value decreases from approximately 10 to approximately 2, which corresponds to an increase in damping from 0.05 of critical to 0.25 of critical.

Figure 5:
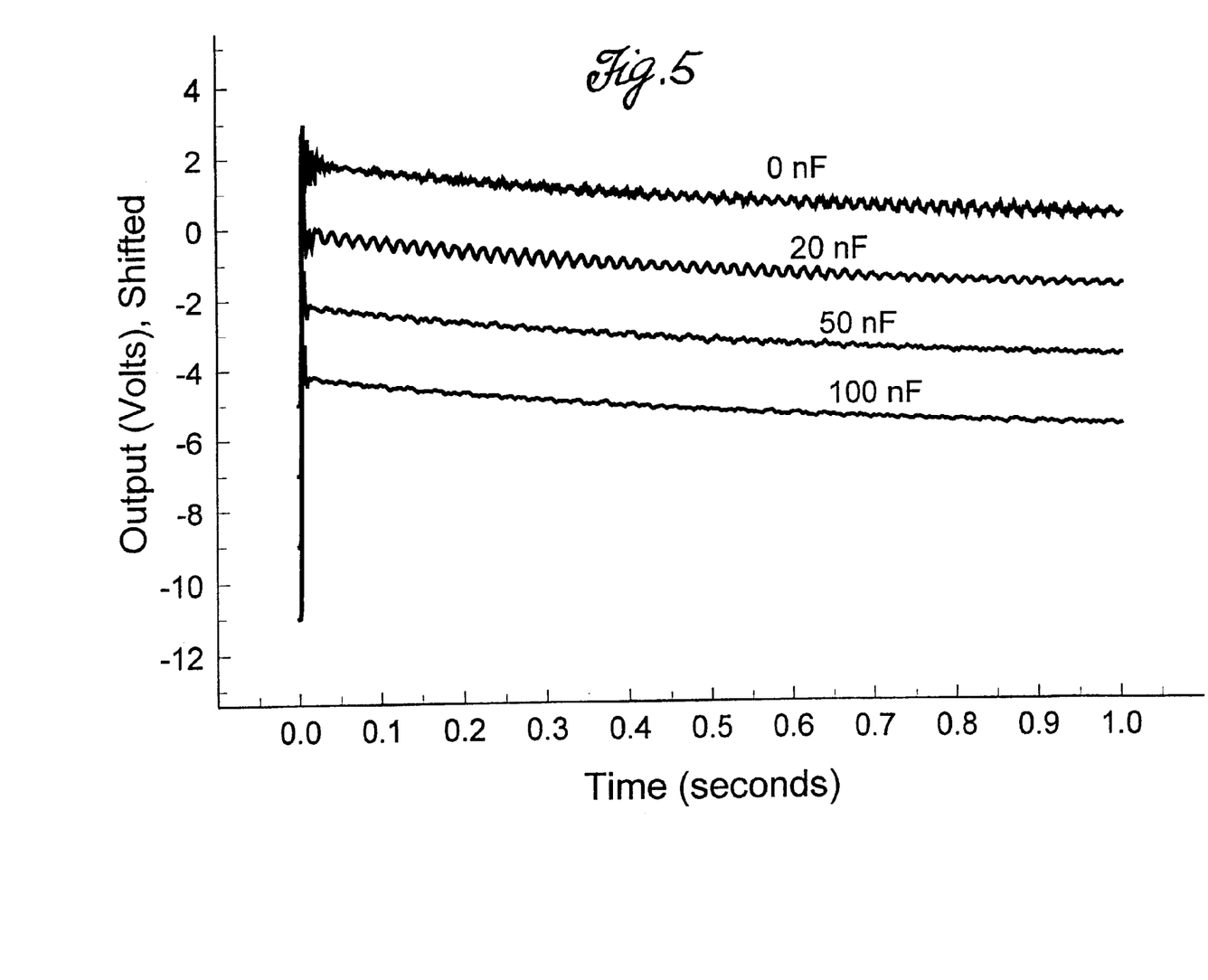
FIG. 5 is a further graph of a response of four configurations of the force-balance feedback geophone with the circuitry of FIG. 3.

Moreover, the use of the circuitry of FIG. 3 does not have significant affects on the low frequency performance of the force-balance feedback geophone. FIG. 5 illustrates exponential decays of a force-balance feedback geophone in response to a step input. FIG. 5 illustrates four curves, corresponding to the four geophones with varying values for the capacitance of capacitor C3 used in FIG. 4. As illustrated in FIG. 5, each of the four configurations have decay curves of voltage v. time largely identical, although offset in voltage. As the exponential decay time constant is representative of a low frequency response of a geophone, modification of the magnitude of the capacitance of the capacitor C3 provides little impact on the low frequency response of the geophone.

Figure 6:
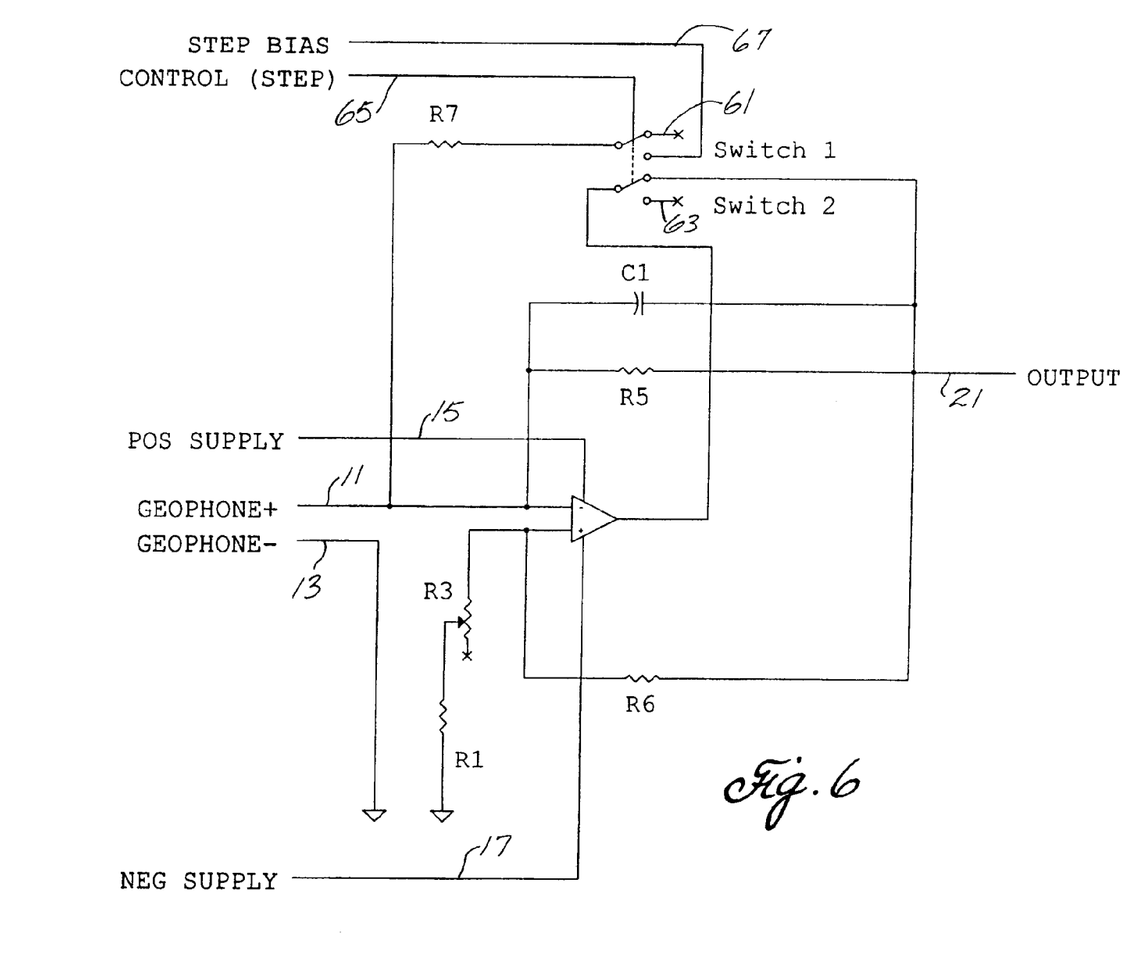
FIG. 6 is a circuit schematic of circuitry for a force-balance feedback geophone providing for in situ determination of frequency response.

FIG. 6 illustrates circuitry for a force-balance geophone allowing for in situ characterization of the frequency response of the geophone. The circuitry illustrated in FIG. 6 is similar to the circuitry of FIG. 1. Thus, and as with the circuitry of FIG. 1, the geophone receives its inputs in a geophone positive terminal, a geophone negative terminal, a positive power supply, and a negative power supply. The geophone positive terminal is connected to an inverting input of an amplifier 19, and a geophone negative input is coupled to ground. The amplifier noninverting input is coupled to a trimming resistor R3 in series with a reference resistance R1. The operational amplifier includes a negative feedback path comprised of a resistor R5 and parallel with a capacitor C1. The amplifier also has a positive feedback path comprised of a resistor R6.

The circuitry of FIG. 6, however, additionally includes a first switch 61 and a second switch 63. The first switch is normally open, and is connected to the amplifier inverting input by a resistor R7. When closed, the first switch connects a step bias input to the resistor R7. The second switch is normally closed, and is disposed on the amplifier output. When open, the second switch disconnects the amplifier output from the remainder of the circuitry.

Both the first switch and the second switch are provided a control signal 65. Application of the control signal causes the first switch to close, resulting in the step bias input signal being applied to the resistor R7. Application of the control signal causes the second switch to go to the open position, thereby leaving the amplifier feedback paths open. In the embodiment described, the first switch and the second switch are implemented using transistor circuits. In an alternative embodiment, the first switch and the second switch are implemented using relay operated solenoid held switches.

Application of the control signal along with the step bias signal therefore results in application of an input step to the geophone positive terminal. As the output of the amplifier is left open, the geophone coil is not provided a counteracting force so as to cancel the effect of the step input. Thus, in situ testing of the geophone is provided the use of the circuitry of FIG. 6.

Figure 7:
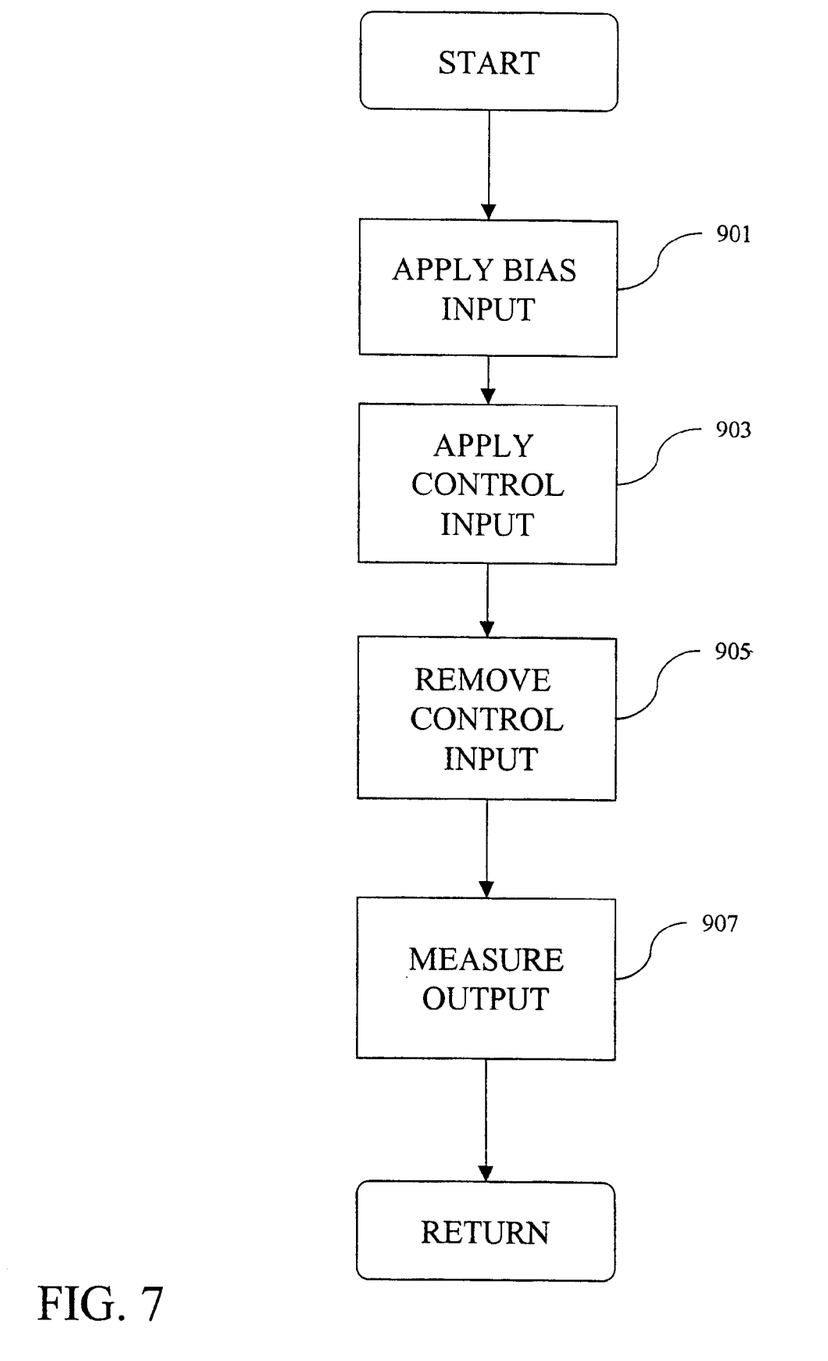
FIG. 7 is a flow diagram of a process for determining a frequency response of a force-balance feedback geophone with the circuitry of FIG. 6.

More specifically, in one embodiment a process, a flow diagram of which is illustrated in FIG. 7, is performed to determine a frequency response of a force-balance geophone. In block 901 a step bias voltage is determined and applied. The block bias voltage magnitude is determined based in part, on a desired current magnitude through a geophone coil. In step 903 a step input is applied to the control input. Application of the step input to the control input closes switch 1 of the circuitry of FIG. 6, and opens switch 2 of the circuitry of FIG. 6. As a result of the change in switch positions, current flows through the geophone coil, thereby resulting in an induced force which displaces the geophone coil a distance proportional to the magnitude of the current. As switch is open, force-balance feedback is not effective to prevent displacement of the geophone coil.

In block 905 the step control input is removed. Removal of the step control input results in the opening of switch 1 and closing of switch 2. The opening of switch 1 and the closing of switch 2 results in the fore-balance geophone being placed in its normal operating condition. However, the geophone coil is in a displaced position, from which it will attempt to return upon removal of the step bias input. Accordingly, in block 909 the output voltage of the circuitry of FIG. 6 is measured. Measurement of the output voltage provides for the step response of the force-balance geophone.

Figure 8:
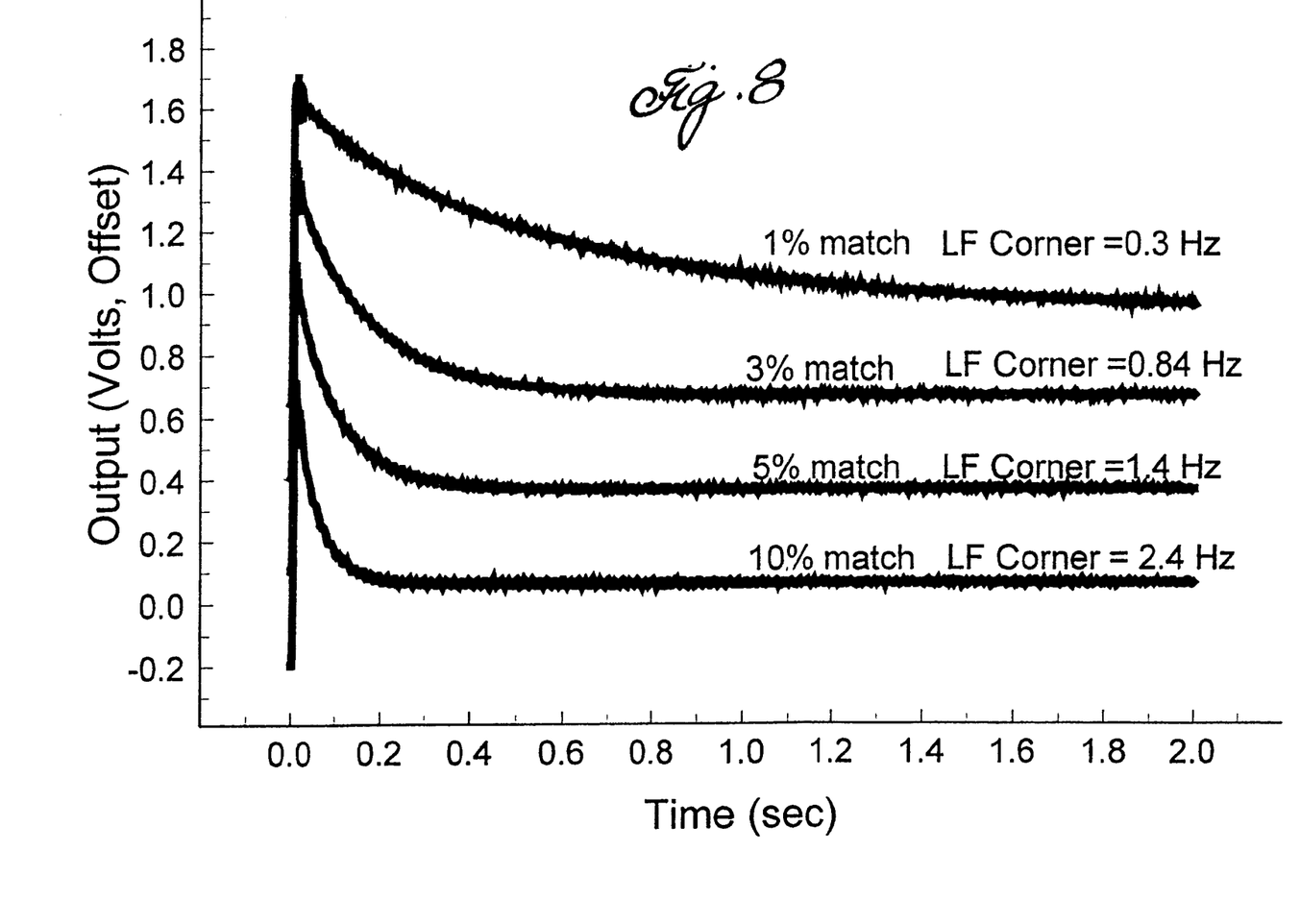
FIG. 8 is a graph of responses to an input of several configurations of a force-balance feedback geophone incorporating the circuitry of FIG. 6.

FIG. 8 illustrates the results of the application of the process of FIG. 7 for four configurations of the geophone of FIG. 8. FIG. 8 is a graph of an exponential decay rate. For a 1% mismatch between the reference resistance and the geophone coil impedance, a low frequency corner is approximately 0.3 Hz. For a configuration having a 3% mismatch between the reference resistance and the geophone coil, the low frequency corner frequency is approximately 0.84 Hz. Similarly, for configuration of a 5% mismatch between the reference impedance and the geophone coil impedance, the low frequency corner is 1.4 Hz, and the low frequency corner is 2.4 Hz for a 10% mismatch between the reference impedance and the geophone coil impedance.

Figure 9:
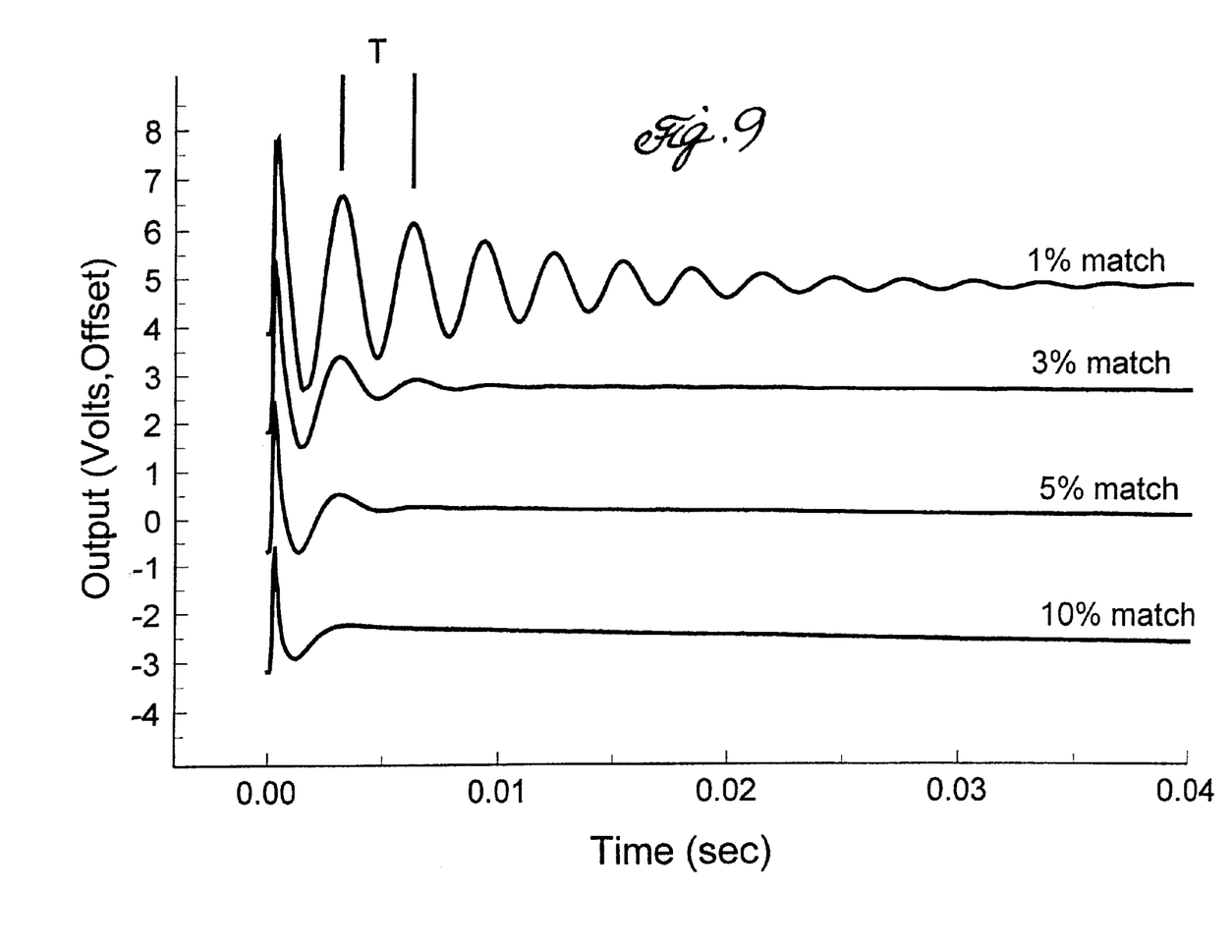
FIG. 9 is a further graph of responses to an input of several configurations of a force-balance feedback geophone incorporating the circuitry of FIG. 6.

FIG. 9 illustrates a high frequency response resulting from the process of FIG. 7 for the configurations described with respect to FIG. 8. The graph of FIG. 9 provides an indication of the resonant frequency of the devices and the damping of the devices. This is due, in part, to the period of oscillation of the output being inversely proportional to the resonant frequency of the device, as well as the decay rate of oscillation being proportional to damping, i.e, inversely proportional to Q, of the device. The determination of the low frequency corner, directly corresponding to a single R-C pole, and of the higher resonant frequency and damping allows for the calculation of a frequency response.

The present invention therefore provides for a force-balance feedback accelerometer with increased bandwidth, control of damping, that is capable of being characterized in situ. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A force balance feedback geophone comprising:

a geophone housing having a coil mounted by a spring therein, the coil being in a magnetic field and having a first terminal and a second terminal;

an amplifier with a feedback circuit forming a feedback path, the amplifier having an input coupled to the first terminal;

a feedback switch in the feedback path responsive to a control input, the feedback switch having a first state opening the feedback path and a second state closing the feedback path; and a bias switch coupled to the first terminal or the second terminal, the bias switch being responsive to the control input and having a first state coupling the first terminal or the second terminal to a bias input and a second state not coupling the first terminal or the second terminal to the bias input.

2. The force balance feedback geophone of claim 1 wherein the bias switch is coupled to the first terminal.

3. The force balance feedback geophone of claim 2 wherein the amplifier comprises an operational amplifier and the feedback path includes a positive feedback path and a negative feedback path.

4. The force balance feedback geophone of claim 3 wherein the positive feedback path includes a first resistance in parallel with a second resistance in series with a first capacitance.

5. The force balance feedback geophone of claim 3 wherein the first terminal is coupled to an inverting input of the operational amplifier and further comprising a reference resistance coupled to a noninverting input of the operational amplifier.

6. The force balance feedback geophone of claim 5 further comprising, in series, a second capacitance and a third resistance in parallel to the reference resistance.

7. A method of characterizing a force balance feedback geophone comprising:

disconnecting a feedback element of the force balance feedback geophone from a coil of the force balance feedback geophone;

displacing the coil of the force balance feedback geophone;

connecting the feedback element of the force balance feedback geophone to the coil of the force balance feedback geophone; and measuring an output of the force balance feedback geophone.

8. The method of characterizing a force balance feedback geophone of claim 7 wherein displacing the coil of the force balance feedback geophone is accomplished by passing a current through the coil of the force balance feedback geophone.

9. The method of characterizing a force balance feedback geophone of claim 8 wherein disconnecting the feedback element of the force balance feedback geophone from the coil of the force balance feedback geophone is accomplished using an electrically controlled switch, the electrically controlled switch.

10. The method of characterizing a force balance feedback geophone of claim 9 wherein disconnecting the feedback element of the force balance feedback geophone from the coil of the force balance feedback geophone comprises applying a control signal to the electrically controlled switch.

11. A force balance feedback geophone comprising:

a single coil velocity geophone having first and second terminals;

an amplifier with a first input coupled to the first terminal, a second input coupled to a reference resistance, and a first feedback path to the first terminal and a second feedback path to the second terminal; and the second feedback path providing RC feedback compensation.

12. A force balance feedback geophone comprising:

a single coil velocity geophone having first and second terminals;

an amplifier with a first input coupled to the first terminal, a second input coupled to a reference resistance, and a first feedback path to the first terminal and a second feedback path to the second terminal, the second feedback path including a resistance in parallel with a capacitance.

13. The force balance feedback geophone of claim 12 further comprising a second resistance in series with the capacitance.

14. A force balance feedback geophone comprising:

a single coil velocity geophone having first and second terminals;

an amplifier with a first input coupled to the first terminal, a second input coupled to a reference resistance, and a first feedback path to the first terminal and a second feedback path to the second terminal; and a capacitance in parallel with the reference resistance.

15. A force balance feedback geophone of claim 14 further comprising a second resistance in series with the capacitance.

* * * * *